(12) United States Patent
Hamamura et al.

(10) Patent No.: US 7,578,867 B2
(45) Date of Patent: Aug. 25, 2009

(54) CERAMIC SINTERED PRODUCT AND METHOD FOR PRODUCTION THEREOF, AND DECORATIVE MEMBER USING THE CERAMIC SINTERED PRODUCT

(75) Inventors: Kenichi Hamamura, Kirishima (JP); Saburou Nagano, Kirishima (JP)

(73) Assignee: Kyocera Corporation, Kyoto (JP)

( * ) Notice: Subject to any disclaimer, the term of this patent is extended or adjusted under 35 U.S.C. 154(b) by 182 days.

(21) Appl. No.: 11/536,494

(22) Filed: Sep. 28, 2006

(65) Prior Publication Data

US 2007/0044588 A1    Mar. 1, 2007

Related U.S. Application Data

(63) Continuation of application No. PCT/JP2005/005717, filed on Mar. 28, 2005.

(30) Foreign Application Priority Data

Mar. 29, 2004  (JP) ............................. 2004-093941
Jul. 29, 2004  (JP) ............................. 2004-221392

(51) Int. Cl.
  *C22C 29/16*  (2006.01)
  *C22C 29/04*  (2006.01)

(52) U.S. Cl. .............................. 75/235; 75/242; 75/244; 419/13; 419/14; 419/19

(58) Field of Classification Search .................. 75/235, 75/242, 244; 419/13, 14, 19
See application file for complete search history.

(56) References Cited

U.S. PATENT DOCUMENTS

| | | | | |
|---|---|---|---|---|
| 3,409,419 A | * | 11/1968 | Yates | 428/539.5 |
| 3,514,271 A | * | 5/1970 | Yates | 75/233 |
| 3,669,695 A | * | 6/1972 | Iler et al. | 501/87 |
| 4,589,917 A | * | 5/1986 | Nagato | 75/238 |
| 4,639,426 A | * | 1/1987 | Nagato et al. | 501/96.1 |
| 4,702,769 A | * | 10/1987 | Fukuhara et al. | 75/233 |
| 5,296,016 A | * | 3/1994 | Yoshimura et al. | 75/238 |
| 5,376,466 A | * | 12/1994 | Koyama et al. | 428/698 |
| 5,682,595 A | * | 10/1997 | Gonseth et al. | 428/552 |

FOREIGN PATENT DOCUMENTS

| | | |
|---|---|---|
| JP | 51-006109 | 1/1976 |
| JP | 02-048467 | 2/1990 |
| JP | 04-271739 | 9/1992 |
| JP | 04-281730 | 10/1992 |
| JP | 05-311311 | 11/1993 |
| JP | 06-172910 | 6/1994 |
| JP | 07-062274 | 7/1995 |
| JP | 11-071626 | 3/1999 |
| JP | 2003-013154 | 1/2003 |
| JP | 2003-252682 | 9/2003 |

* cited by examiner

*Primary Examiner*—Roy King
*Assistant Examiner*—Ngoclan T Mai
(74) *Attorney, Agent, or Firm*—Hogan & Hartson LLP (57) ABSTRACT

A ceramic sintered product which comprises a first hard phase containing a nitride of titanium, a second hard phase containing at least one of alumina and zirconia, and a binding phase containing nickel; and a method for producing the ceramic sintered product. The ceramic sintered product is lightweight and exhibits good abrasion resistance in a wet atmosphere, and further can be produced at a low cost.

16 Claims, 1 Drawing Sheet

Fig. 1

CERAMIC SINTERED PRODUCT AND METHOD FOR PRODUCTION THEREOF, AND DECORATIVE MEMBER USING THE CERAMIC SINTERED PRODUCT

CROSS-REFERENCE TO THE RELATED APPLICATION

This is a continuation of PCT application No. PCT/JP2005/005717 filed Mar. 28, 2005, the entire contents of which are incorporated by reference. This application also claims benefit of priority under 35 U.S.C. § 119 to Japanese Application No. 2004-093941 filed Mar. 29, 2004 and Japanese Application No. 2004-221392 filed Jul. 29, 2004, the entire contents of which are incorporated by reference

BACKGROUND OF THE INVENTION

1. Field of the Invention

The invention relates to a ceramic sintered product to be used as a broach, a necklace, a medal, a button, a wall material, an abrasion resistant part for various kitchen members, and the like and its production method. The invention relates to a ceramic sintered product particularly suitable for a decorative member for a guide member of fishing line, a case for a watch, and a window member of a watch, and the like having beautiful color tone and its production method.

2. Description of the Related Art

Conventionally as members for fishing tools, e.g. a guide member of a fishing line have been used those which are made of plastics or metals such as a stainless steel. Guide members made of plastics or metals are not broken even if they are hit against rocks or concrete at the time of use, however since their hardness is low, there is a problem that they are abraded with fine sand adhering to the line and their surfaces are scratched.

Therefore, to solve such a problem, Japanese Patent Application Laid-Open (JP-A) No. 4-271739 discloses a guide member for a fishing line produced from a sintered product containing at least one of carbides, nitrides, or carbonitrides of Group IVA metal elements and Group VA metal elements in an amount of 50% by volume in the member for fishing and having a porosity of 5% or lower.

Further, JP-A No. 4-281730 discloses a guide member for a fishing line consisting of 60% by volume or more of a hard phase containing a carbide, a nitride, or a carbonitride of Group IVA metal elements, Group VA metal elements, and Group VIA metal elements and 40% by volume or lower of a binding phase containing a ferrous metal element.

Further, JP-A No. 11-71626 discloses a guide member for a fishing line consisting of a hard phase containing an oxynitride of titanium, a reinforcing phase of zirconia, and a binding phase of a metal containing mainly molybdenum.

As decorative members exhibiting gold color to be used for decoration such as the guide member of a fishing line have been used various kinds of metals such as pure gold, their alloys, brass, or metals plated with gold, however since they all have low hardness, their surfaces are scratched or cracked by contact with a hard substance.

Therefore, to solve such a problem, Japanese Patent Application Publication (JP-B) No. 7-62274 discloses a specular product obtained by alloy plating of a metal surface with an alloy containing Cu 70 to 85% by atom, Zn 15 to 25% by atom, and Ni 1 to 10% by atom and having gold color tone of the plating film in ranges of L* from 80 to 95, a* from −5 to 0, and b* from 15 to 25 on the basis of CIE1976 space L*a*b* model.

Further, JP-A No. 5-311311 discloses a gold color sintered alloy containing titanium 55 to 70% by weight, ferrous metal elements and Group VIA elements including at least chromium 10 to 30% by weight in total amount, and balance carbon and nitrogen and having a carbon ratio 0.7% by weight or lower in the total amount and a chromium ratio of 35% by weight or more in metals excluding titanium and satisfying lightness L*≧10, chromaticness a*≦+0.4 and b*≧+8.0 in the L*a*b* color model defined in JIS Z8730.

Further, JP-A No. 2003-13154 discloses a sintered alloy consisting of a hard phase containing titanium nitride 45 to 75% by weight and titanium carbide 7.5 to 25% by weight and a binding phase containing chromium 1 to 10% by weight on the basis of a carbide in the total weight, molybdenum 0.1 to 5% by weight on the basis of a carbide in the total weight, and nickel 5 to 20% by weight in the total weight and having lightness in ranges of L* from 65 to 69, a* from 4 to 9, and b* from 5 to 16 in the L*a*b* color model measured by a colorimeter.

SUMMARY OF THE INVENTION

However, although the guide members disclosed in JP-A No. 4-271739 and JP-A No. 4-281730 and containing titanium oxide sintered products show good abrasion resistance in the case a fishing line is slid thereon in dry state, titanium nitride in the portions of the guide members where the fishing line is slid is oxidized to be titanium oxide in the case the guide members for a fishing line are subjected to sliding with a fishing line in wet state. Due to the oxidation reaction, since the titanium nitride particles in the portions slid by the fishing line are expanded in volume as much as 1.5 times, the titanium oxide particles tend to drop out and it results in occurrence of a problem that the guide member of the fishing line is worn out within a short time. Further, in the case of a guide member for a fishing line using a cemented sintered product, even if a fish is hooked on a fishing hook, the cemented sintered product has a specific weight so high and sensitivity so inferior that the timing of fishing up the fish may be missed and it may allow the fish to escape.

The guide member for a fishing line disclosed in JP-A No. 11-71626 is produced by the following process. First, a titanium nitride powder, a titanium oxide powder, a zirconium nitride powder, and a molybdenum powder are mixed, pulverized, and formed by desired forming means. Next, an obtained formed body is degreased at a prescribed temperature in non-oxidizing atmosphere and sintered in vacuum or in non-oxidizing atmosphere and no pressure application and then the resulting sintered product is fired by hot isostatic pressing (HIP) to obtain a desired guide member for a fishing line. However, it is required to carry out firing under no pressure application and firing by hot isostatic pressing (HIP) for obtaining the guide member for a fishing line disclosed in JP-A No. 11-71626 and therefore there is a problem that the firing costs much.

Further, in the case gold color tone is required for the guide member for a fishing line, even if the specular product with gold tone disclosed in JP-B No. 7-62274 is used for the above-mentioned guide member, since the product is provided with the gold color tone by forming a film by alloy plating of copper, zinc, and nickel, occurrence of an inevitable problem that the film may be peeled consequently in future cannot be avoided.

Further, since a gold-color sintered alloy disclosed in JP-A No. 5-311311 shows the gold color tone by the sintered product itself, no coating formation is required and the peeling problem can be solved, however since the chromaticness index a* showing the chroma is +0.4 or lower, it shows a dull color and is not necessarily satisfactory for a possessor who requires decorative value.

Although being free from the problem of peeling of the film, since the sintered alloy disclosed in JP-A No. 2003-13154 also has a chromaticness index b* showing the hue is as small as 5 to 16, the hue tends to be slightly intensified in green color and therefore, it is not necessarily satisfactory for a possessor who requires decorative value.

The invention therefore aims to provide a ceramic sintered product that is lightweight, has good abrasion resistance in wet state and high inspection precision by an automatic appearance inspection apparatus, gives satisfactorily beautiful, high grade, and mentally soothing impressions to a possessor who requires decorative value, and also shows gold color tone and to provide a method of producing the ceramic sintered product at a low cost.

A ceramic sintered product of the invention consists of a first hard phase containing a nitride of titanium, a second hard phase containing at least one of alumina and zirconia, and a binding phase containing nickel.

Further, the ceramic sintered product described above consists of 2 to 25% by weight of the second hard phase and 4 to 10% by weight of the binding phase.

Further, the ceramic sintered product described above consists of the first phase containing carbon in solid phase and defined by the following formula $TiC_xN_{(1-x)}$ ($0.01 \leq x \leq 0.08$).

Further, the ceramic sintered product described above consists of 3 to 7.4% by weight of chromium carbide in addition.

Further, the ceramic sintered product described above consists of the first hard phase and the second hard phase both having the average grain diameter of 0.6 to 2.6 μm.

Further, the ceramic sintered product described above has the surface lightness L* in a range from 60 to 70 and the surface chromaticness a* and b* in ranges of 7.0 to 8.2 and 16.5 to 24.5, respectively, in the L*a*b* color model in CIE 1976 space.

Further, the ceramic sintered product described above has 27.7% or higher difference between the maximum value and the minimum value of the surface reflectance in the visible region.

Further, the ceramic sintered product described above has 0.2 μm or smaller surface arithmetical mean deviation Ra.

Further, the ceramic sintered product described above has 2% or smaller porosity.

Further, the ceramic sintered product described above has 50 μm or smaller diameter of the voids in the surface.

Further, the ceramic sintered product described above has 7 $MPa \cdot m^{0.5}$ or higher fracture toughness $K_{1C}$.

A production method of the ceramic sintered product of the invention involves steps of mixing a powder of titanium nitride, a powder containing at least alumina and zirconia, and a powder of nickel for obtaining a starting material mixture, forming a formed body with a prescribed form by pressure compacting the starting material mixture, and producing sintered product by heating and sintering the formed body in atmosphere containing at least one of nitrogen and inert gases or in vacuum.

The production method of the ceramic sintered product of the invention is carried out using the starting material mixture having 0.5 μm or smaller pulverized grain size (D50).

The production method of the ceramic sintered product of the invention involves the forming at a forming pressure in a range from 49 to 196 MPa.

The production method of the ceramic sintered product of the invention involves the heating and sintering at a vacuum degree in a range from 1.33 Pa or lower.

The production method of the ceramic sintered product of the invention involves the heating and sintering at a temperature in a range from 1200 to 1800° C.

Further, the above-mentioned ceramic sintered product is used as a decorative member.

The invention provides a ceramic sintered product consisting of a first hard phase containing a nitride of titanium, a second hard phase containing at least one of alumina and zirconia, and a binding phase containing nickel, so that although the first hard phase containing the nitride of titanium is expanded in the volume because of oxidation of the surface in the case of sliding in wet state, the first hard phase can be protected by the second hard phase and prevented from separation and consequently the ceramic sintered product can be provided with excellent abrasion resistance.

Further, since the ceramic sintered product consists of the first hard phase containing carbon in solid solution state and defined by the following molecular formula $TiC_xN_{(1-x)}$ ($0.01 \leq x \leq 0.08$), the ceramic sintered product is provided with high decorative value and high hardness and excellent abrasion resistance.

Further, since the ceramic sintered product consists of 2 to 25% by weight of the second hard phase and 4 to 10% by weight of the binding phase, the ceramic sintered product is provided with good abrasion resistance in wet state and high decorative value and the ceramic sintered product can be easily obtained at a low cost.

Further, since the ceramic sintered product additionally consists of 3 to 7.4% by weight of chromium carbide, the ceramic sintered product is also provided with high fracture toughness in addition to the high decorative value and high hardness.

Further, since the ceramic sintered product consists of the first hard phase and the second hard phase both having the average grain diameter of 0.6 to 2.6 μm, the ceramic sintered product is excellent in the abrasion resistance with scarce possibility of grain separation.

Further, since the ceramic sintered product has the surface lightness L* in a range from 60 to 70 and the surface chromaticness a* and b* in ranges of 7.0 to 8.2 and 16.5 to 24.5, respectively, in the L*a*b* color model in CIE 1976 space, the ceramic sintered product is lightweight and can make it easy to inspect a foreign substance contained in voids and having different appearance color from that of the ceramic sintered product and thus can heighten the inspection precision by an automatic appearance inspection apparatus, and the color tone can cause an excellent synergetic effect and give satisfactorily beautiful, high grade, and mentally soothing impressions to a possessor.

Further, since the ceramic sintered product has 27.7% or higher difference between the maximum value and the minimum value of the surface reflectance in the visible region, the metamerism phenomenon that the color tone of the ceramic sintered product observed under a certain light source and the color tone of the ceramic sintered product observed under another light source are not seen the same or the color tone is seen differently in depending on the seeing angle even under a single light source and accordingly, a possessor of the ceramic sintered product of the invention can enjoy various color tones.

Further, since the ceramic sintered product d has 0.2 μm or smaller surface arithmetical mean deviation Ra, the glossiness of the surface and luster are increased and a high grade impression is given.

Further, since the ceramic sintered product has 2% or smaller porosity and 50 μm or smaller diameter of the voids in the surface, the inspection precision by an automatic appearance inspection apparatus can be improved further, and in the case the ceramic sintered product has a circular body that is used as a guide member for a fishing line, damages and cutting of the fishing line by the edges of the voids existing in the inner circumferential face of the circular body can be suppressed.

Further, since the ceramic sintered product has 7 MPa·m$^{0.5}$ or higher fracture toughness $K_{1C}$, in the case the ceramic sintered product is used for a guide member for a fishing line, no micro-crack is formed even if the guide member is hit against a shore reef and a sunken rock and thus the decoration value can be maintained a long duration.

Further, since a production method of the invention for producing the ceramic sintered product involves steps of mixing a powder of titanium nitride, a powder containing at least alumina and zirconia, and a powder of nickel for obtaining a starting material mixture, forming a formed body with a prescribed form by pressure compacting the starting material mixture, and producing sintered product by heating and sintering the formed body in atmosphere containing at least one of nitrogen and inert gases or in vacuum, it is made possible to obtain a gold color ceramic sintered product that is lightweight and excellent in abrasion resistance can be obtained.

Since the starting material mixture is adjusted to have 0.5 μm or smaller pulverized grain size (D50), the stability is improved in the firing and abnormal grain growth can be prevented.

Further, since the forming pressure is adjusted to be in a range from 49 to 196 MPa, the life of a die or the like to be used for pressure forming can be extended and the porosity of the ceramic sintered product can be suppressed to 2% or lower or the diameter of the voids can be kept 50 μm or smaller and in the case the ceramic sintered product has a circular body that is used as a guide member for a fishing line, damages and cutting of the fishing line by the edges of the voids existing in the inner circumferential face of the circular body can be suppressed.

In the case the above-mentioned sintered product is obtained by heating and sintering, if the vacuum degree is adjusted to be in a range from 1.33 Pa or lower, no oxidation of the first hard phase containing a nitride of titanium occurs and therefore a gold color ceramic sintered product can be obtained.

Since the heating and sintering temperature is adjusted to be in a range from 1200 to 1800° C., the porosity of the ceramic sintered product can be suppressed to 2% or lower or the diameter of the voids can be kept 50 μm or smaller and the firing cost can be saved.

Further, since the decorative member made of the above-mentioned ceramic sintered product can give satisfactorily beautiful, high grade, and mentally soothing impressions to a possessor, it is preferably usable as a guide member for a fishing line and a case for a watch.

DESCRIPTION OF THE PREFERRED EXAMPLES

Hereinafter, embodiments of the invention will be described along with the drawing.

A ceramic sintered product of the invention consists of a first hard phase containing a nitride of titanium, a second hard phase containing at least one of alumina and zirconia, and a binding phase containing nickel.

The first hard phase containing a nitride of titanium contributes to exhibition of the color tone of gold. Further, since being slid in wet state, the surface layer of the first hard phase is converted into an oxide to expand the volume and to make the surface easy to be peeled, the second hard phase containing at least one of alumina and zirconia contributes to prevention of the peeling. The binding phase containing nickel contributes to binding of the first hard phase and the second hard phase. Further, both of the second hard phase and binding phase are for adjusting the color tone of the ceramic sintered product.

The above-mentioned second hard phase is preferably in an amount from 2 to 25% by weight. Herein, that the second hard phase is preferably in an amount from 2 to 25% by weight is because the abrasion resistance in the wet state is decreased if the amount is less than 2% by weight and the color tone of gold color of the ceramic sintered product becomes dull and the decorative value is lowered if the amount exceeds 25% by weight. If the amount of the second hard phase is controlled to be in a range from 2 to 25% by weight, the ceramic sintered product is provided with good abrasion resistance in the wet state and decorative value.

Further, the above-mentioned binding phase is preferably in an amount from 4 to 10% by weight. Herein, that the second hard phase is preferably in an amount from 4 to 10% by weight is because no dense product as a decorative member can be obtained if the amount is less than 4% by weight and the color tone of gold color of the ceramic sintered product becomes dull and the decorative value is lowered if the amount exceeds 10% by weight.

Inevitable impurities of the ceramic sintered product are preferably silicon, phosphorus, sulfur, manganese, iron, cobalt, niobium, and molybdenum and the amounts of respective elements are preferably 1% by weight or lower each.

The first hard phase is preferable to contain carbon in a solid solution and to be defined by the molecular formula $TiC_xN_{(1-x)}$ ($0.01 \leq x \leq 0.08$).

The hardness is higher in the order as TiN, TiCN, and TiC and the abrasion resistance is also higher in the order and the decorative value is changed as well. If the first hard phase contains carbon in a solid solution and is defined by the molecular formula $TiC_xN_{(1-x)}$ ($0.01 \leq x \leq 0.08$), the ceramic sintered product is provided with improved abrasion resistance and high decorative value.

Further, it is preferable for the ceramic sintered product to contain chromium carbide in an amount from 3 to 7.4% by weight and the fracture toughness $K_{1c}$ can be high by controlling the amount of chromium carbide to be 3% by weight or higher and the reddish color tone can be suppressed to keep the decorative value by controlling the amount of chromium carbide to be 7.4% by weight or lower. The chromium carbide is contained mainly in the binding phase and contributes to binding of the first hard phase itself and the first hard phase and the second hard phase. Further, the binding phase may contain zinc and the amount is preferably 1% by weight or lower in the ceramic sintered product.

The average crystal grain diameter of the ceramic sintered product is preferably 0.6 to 2.6 μm.

That the average crystal grain diameter of the ceramic sintered product is preferably 0.6 to 2.6 μm is because in the case the ceramic sintered product is used for a guide member for a fishing line, if the average crystal grain diameter is smaller than 0.6 μm, excessive grain boundaries may exist and the grain boundaries are eroded by abrasion with the fishing line to which seawater containing a large quantity of sludge to make the abrasion resistance insufficient. Further, it is because if the average crystal grain diameter exceeds 2.6 µm, the possibility of separation of grains from the first hard phase and the second hard phase becomes high. If the average crystal grain diameter is controlled to be in a range from 0.6 to 2.6 µm, the ceramic sintered product is provided with excellent abrasion resistance and made free from the possibility of grain separation.

The average crystal grain diameter of the ceramic sintered product may be measured using a scanning electron microscopic (hereinafter, a scanning electron microscope is referred to as SEM) photograph with a magnification in a range from 4000 to 6000 by measuring a cross section of the ceramic sintered product by code rule or by numerically analyzing the observed image with a magnification in a range from 4000 to 6000 obtained by SEM. In the case the code rule is employed, practically the grain diameter is measured from the number of the grain boundaries existing in a straight line with a prescribed length by using the SEM photograph and the average is calculated. Herein, to avoid deviation of the measured value of the average crystal grain diameter, it is preferable to measure for 5 or more lines. Since the binding phase becomes amorphous without becoming crystalline since grain boundaries are formed, the binding phase is inevitably excluded from the objects for calculation.

Further, in the case the ceramic sintered product is a circular body and a thread made of nylon or polyethylene wet with water is brought into contact with the inner circumferential face of the circular body and slid on it at 500 g load and 70 m/min speed in the running distance of 1000 m, the abrasion depth in the circular body may be suppressed to 2 µm or thinner depending on the first hard phase, the second hard phase, and the binding phase and in the case the circular body is used as the guide member for a fishing line, the life is improved. In the case the circular body has no second hard phase, when the thread made of nylon or polyethylene is slid in the above-mentioned condition, the surface of the second hard phase is oxidized and the volume expansion occurs, however since there is no protection by the second hard phase, the abrasion is promoted significantly and the depth exceeds 2 µm and it cannot be expected that the guide member for a fishing line can have a long life.

Figure 1:
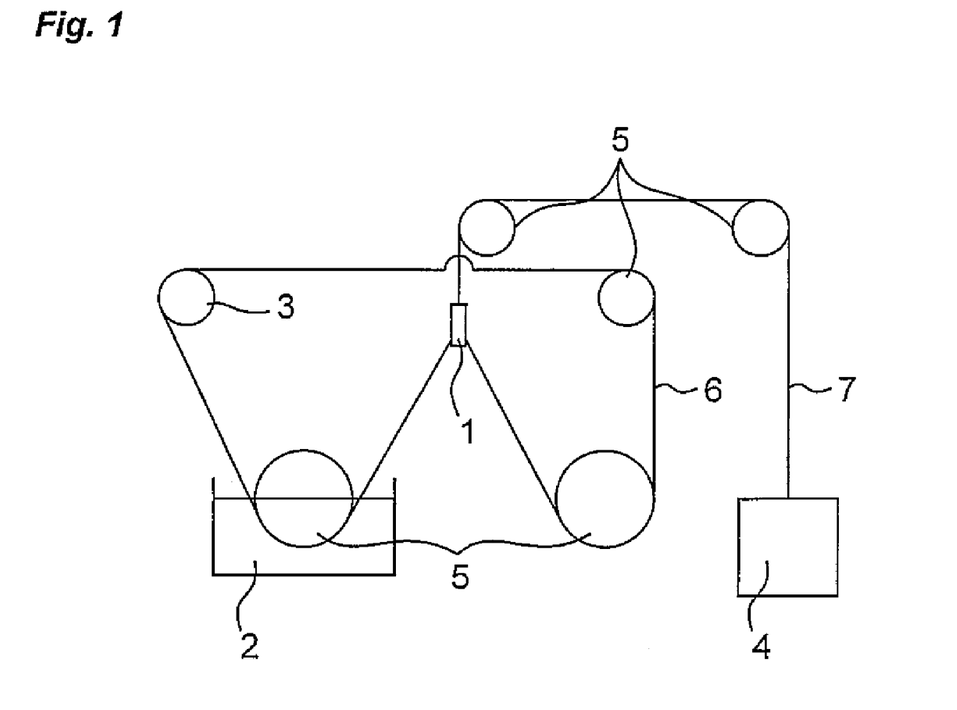
FIG. 1 is a schematic structural drawing showing an apparatus for evaluating the wear resistance of a ceramic sintered product according to the invention.

To evaluate the abrasion resistance, for example, an abrasion resistance evaluation apparatus having the schematic structure shown in FIG. 1 may be employed. The abrasion resistance evaluation apparatus comprises a motor 3 for making a thread 6 made of nylon or polyethylene run, a pulley 5 for applying the tensile force to the thread 6 at a prescribed position, and a water tank 2 to deposit water to the thread 6 and has a feature of applying a load 4 on a circular body 1 fixed by a tool (not illustrated) at a prescribed position for adjusting the tensile force of the thread 6 through the wire 7 and sliding the thread 6 bearing water on the inner circumferential face of the circular body 1.

The evaluation condition of the abrasion resistance may be set as the speed of the thread 6 sliding on the inner circumferential face is at 70 m/min and a running distance is 1000 mm or longer, under conditions of 500 g load of as the load 4. Further, seawater is desirable as the water to be deposited on the thread 6, however it may be pure water or nonionic water.

The ceramic sintered product of the invention is preferable to have the surface lightness $L^*$ in a range from 60 to 70 and the surface chromaticness $a^*$ and $b^*$ in ranges of 7.0 to 8.2 and 16.5 to 24.5, respectively, in the $L^*a^*b^*$ color model in CIE 1976 space.

Herein, that the surface lightness $L^*$ is set to be in a range from 60 to 70 is because if it is lower than 60, the blackish color tone is intense and in the case there is a metal foreign substance seen to be black in the surface of the ceramic sintered product, it becomes difficult to distinguish the foreign substance in the inspection step. On the other hand, if the surface lightness $L^*$ is set to be higher than 70, white color tone becomes intense and in the case there is a foreign substance seen to be white in the surface of the ceramic sintered product, it becomes difficult to distinguish the foreign substance in the inspection step.

Further, that the chromaticness $a^*$ is set to be in a range from 7.0 to 8.2 is because if it is lower than 7.0, the hue and brightness may be insufficient and if it is higher than 8.2, the reddish color tone becomes intense and gives too vivid and scarcely causes a high grade impression.

Further, that the chromaticness $b^*$ is set to be in a range from 16.5 to 24.5 is because if it is lower than 16.5, the hue and brightness may be insufficient and if it is higher than 24.5, the yellowish color tone becomes intense and activates the autonomic nerve of a possessor and scarcely causes psychologically soothing effect on the possessor.

Titanium nitride is contained as a main component and the surface lightness $L^*$ is set in a range from 60 to 70 and the surface chromaticness $a^*$ and $b^*$ is set in ranges of 7.0 to 8.2 and 16.5 to 24.5, respectively, so that the ceramic sintered product can be made to be lightweight and in addition it also can be made easy to inspect foreign substances existing in the voids and having different appearance colors from that of the ceramic sintered product and thus the inspection precision by the automatic appearance inspection apparatus can be improved. Additionally, the color tone causes an excellent synergetic effect and gives the satisfactorily beautiful, high grade, and mentally soothing impressions to a possessor.

The word "surface" in the invention does not mean the entire surface, that is, "the surface" does not include the face which is not required to have decorative value but includes only the face required to have decorative value. The lightness $L^*$ and the chromaticness $a^*$ and $b^*$ in the $L^*a^*b^*$ color model in CIE 1976 space can be measured according to JIS 8722-2000 and practically the color tone can be measured by, for example, using a spectrocolorimeter (CM-3700d, manufactured by Konica Minolta Holding Co., Ltd.) and setting a light source at the CIE standard light source D65 and a visible angle 10°.

In the case the ceramic sintered product is adjusted to contain the above-mentioned first hard phase in a range from 76 to 91% by weight, the second hard phase in a range from 2 to 18% by weight, the binding phase in a range from 5 to 9% by weight, the lightness $L^*$ can be adjusted to be in a range from 60 to 70 and the surface chromaticness $a^*$ and $b^*$ can be adjusted to be in ranges of 7.0 to 8.2 and 16.5 to 24.5, respectively, in the $L^*a^*b^*$ color model in CIE 1976 space and also the production condition setting can be made easy. Particularly it is preferable to adjust the lightness $L^*$ in a range from 63 to 67 and the chromaticness $a^*$ and $b^*$ in ranges of 7.50 to 7.85 and 16.5 to 19, respectively, since the decorative value is heightened.

A production method for obtaining the above-mentioned ceramic sintered product will be described later.

If it also preferable for the ceramic sintered product to have 27.7% or higher difference between the maximum value and the minimum value of the surface reflectance in the visible region. The adjustment in the above-mentioned manner makes a person possible to sense the metamerism phenomenon that the color tone of the ceramic sintered product observed under a certain light source and the color tone of the ceramic sintered product observed under another light source are not seen the same or the color tone is seen differently in depending on the seeing angle even under a single light source. Accordingly, a possessor of the ceramic sintered product of the invention can enjoy the color tone.

To adjust the difference between the maximum value and the minimum value of the surface reflectance in the visible region to be 27.7% or higher, the face of the ceramic sintered product required to have the decorative property is barrel-finished or lapped using a diamond paste to give the surface with the arithmetical mean deviation Ra in a range from 0.05 to 0.22 μm.

The surface reflectance in the visible region may be measured by measuring the maximum value and the minimum value of the surface reflectance in the region using a spectrocolorimeter (CM-3700d, manufactured by Konica Minolta Holding Co., Ltd.) and setting a light source at the CIE standard light source D65 and a visible angle 10° according to JIS Z 8722-2000 and calculating the difference of both values. The surface reflectance in the visible region may be measured by setting a light source at the CIE standard light source D65 and a visible angle 10° according to JIS Z 8722-2000 and measuring the maximum value and the minimum value of the surface reflectance in the region using a spectrocolorimeter (CM-3700d, manufactured by Konica Minolta Holding Co., Ltd.) and calculating the difference of both values.

If the difference of the maximum value and the minimum value of the surface reflectance is controlled to be 33% or higher, it is suitable for more intensely exhibiting the metamerism phenomenon and further if the arithmetical means deviation Ra of the surface is controlled to be 0.2 μM or lower, the glossiness of the surface and luster are increased and a high grade impression is given. To control the arithmetical means deviation Ra of the surface is controlled to be 0.2 μm or lower, an optional face of the ceramic sintered product may be barrel-finished or lapped using a diamond paste having an average particle diameter of 1 μm or smaller.

The arithmetical means deviation Ra can be measured according to JIS B 0601-2000. Particularly, if the arithmetical means deviation Ra is controlled to be 0.15 μm or smaller, a further improved high grade impression can be obtained.

Furthermore, if the porosity of the surface is controlled to be 2% or lower or the pore diameter of the voids is controlled to be 50 μm or smaller, the inspection precision by an automatic appearance inspection apparatus can be improved more and for example, in the case the ceramic sintered product is circular body and the circular body is used as the guide member for a fishing line, damages and cutting of the fishing line due to the edges of the voids existing in the inner circumferential face can be suppressed.

To control the porosity of the surface of the ceramic sintered product to be 2% or lower or the pore diameter of the voids to be 50 μm or smaller, the forming pressure may be adjusted to be 49 MPa or higher and the heating and sintering temperature may be adjusted to be 1200° C. or higher.

The porosity may be measured by Archimedes' method. Particularly, occurrence of cutting the line can be suppressed to control the porosity of the ceramic sintered product to be 1% or lower.

The pore diameter of the voids may be measured by forming the arithmetical mean deviation Ra in a range from 0.05 to 0.2 μm by barrel-finishing the ceramic sintered product or lapping it with a diamond paste; taking a photograph of the surface at 400 times magnification using a metal microscope; and measuring the largest pore diameter of the voids.

Further, if the fracture toughness $K_{1C}$ is controlled to be 7 MPa·m$^{0.5}$ or higher, even in the case the ceramic sintered product is used as the guide member for a fishing line and the guide member is hit against a shore reef and a sunken rock, no micro-crack is formed and thus the decoration value can be maintained for a long duration. To control the fracture toughness $K_{1C}$ to be 7 MPa·m$^{0.5}$ or higher, zirconia may be used for the second hard phase and the ratio may be controlled to be 40% by weight or higher. Particularly, it is preferable to adjust the fracture toughness $K_{1C}$ to be 9.2 MPa·m$^{0.5}$ or higher.

The fracture toughness $K_{1C}$ may be measured according to JIS R 1607-1995.

If the ceramic sintered product as described in detail is used as a guide member for a fishing line, the guide member can be lightweight and is provided with improved abrasion resistance in wet state, so that it can be made easy to sense the hitting when a fish is hooked on a fishing hook and it results in prevention of losing failure.

Next, a production method of the ceramic sintered product of the invention will be described.

To obtain the ceramic sintered product according to the invention, first, prescribed amounts of a powder of titanium nitride for forming the first hard phase, a powder containing at least one of alumina and zirconia for forming the second hard phase, and a powder of nickel for forming the binding phase are weighed and mixed to obtain a starting material mixture. More practically, a titanium nitride powder with an average particle diameter of 15 to 30 μm, a powder containing at least one of alumina and zirconia with an average particle diameter of 1 to 2 μm, and a nickel powder with an average particle diameter of 5 to 20 μm are made available and it is preferable that these powders are weighed and mixed in a manner that the amounts of the titanium nitride powder, the powder containing at least one of alumina and zirconia, and the nickel powder are in ranges of 65 to 94% by weight, 2 to 25% by weight, and 4 to 10% by weight, respectively.

Herein, the titanium nitride powder may be of TiN with the stoichiometric composition or TiN with a non-stoichiometric composition and in terms of the abrasion resistance and color tone with high decorative value, the purity of the respective powders is preferably 99% or higher.

Next, an organic solvent such as isopropyl alcohol is added to the starting material mixture and mixed and pulverized by a mill and successively a prescribed amount of a binder such as a paraffin wax is added and the resulting mixture is formed in a desired form by desired forming means, e.g. dry press, cold isostatic press, or extrusion.

To obtain the ceramic sintered product having the first hard phase containing carbon in solid solution state and defined by the following molecular formula $TiC_xN_{(1-x)}$ (0.01≦x≦0.08), 0.2 to 1.6% by weight of a carbon powder may be added additionally to the above-mentioned powder mixture containing powders of titanium nitride, alumina, zirconia, and nickel at the above-mentioned ratios to obtain the starting material mixture. Alternatively, the starting material mixture may be prepared by mixing and pulverizing the powders of titanium nitride, alumina, zirconia, and nickel at the above-mentioned ratios with a ball of mainly TiC for 90 to 150 hours and thus obtaining a powder mixture containing further TiC derived from the abraded ball. The ball to be used in the mixing and pulverizing step is preferable to be a dense ceramic having a Vicker's hardness Hv of 16 GPa or higher, a fracture toughness $K_{1C}$ of 8.5 MPa·m$^{0.5}$ or higher, and the relative density of 97% or higher.

The pulverized grain diameter (D50) of the above-mentioned starting material mixture is preferable to be 0.5 μm or smaller and owing to that, the stability in the firing can be improved and occurrence of abnormal grain growth can be prevented.

To control the pulverized grain diameter (D50) to be 0.5 μm or smaller, the mixing and pulverizing of the above-mentioned starting material mixture may be carried out for 90 hours or longer and measurement of the pulverized grain diameter (D50) can be measured using a microtrack particle size distribution measurement apparatus by laser diffraction-scattering method.

After the formed body obtained in the above-mentioned manner is degreased, if necessary in nitrogen atmosphere or non-oxidizing atmosphere, the formed body is heated and sintered in atmosphere of at least a gas selected from nitrogen and inert gases or in vacuum to obtain the ceramic sintered product of the invention. Further, the ceramic sintered product is polished by using polishing abrasive grains such as a diamond paste or a barrel to obtain a gold color tone with gloss.

To adjust the difference between the maximum value and the minimum value of the surface reflectance in the visible region to be 27.7% or higher, an optional face of the ceramic sintered product may be barrel-finished or lapped using a diamond paste to form the surfaced having the arithmetical means deviation Ra in a range from 0.05 to 0.2 µm. To make the arithmetical means deviation Ra 0.2 µm or lower, lapping may be carried out using a diamond paste with a smaller average particle diameter and for example, a diamond paste with an average particle diameter of 1 µm or smaller may be used.

Herein, that the formed body is heated and sintered in atmosphere of at least a gas selected from nitrogen and inert gases or in vacuum is because if the heating and sintering is carried out in oxidizing atmosphere, titanium nitride is oxidized to be titanium oxide and affected by the white color tone which titanium oxide intrinsically has to make the resulting ceramic sintered product have whitish and dull color tone in the entire body.

Further, in the case dry pressurizing is employed as forming means, it is preferable to control the forming pressure to be in a range from 49 to 196 MPa. The forming pressure is controlled to be 49 MPa or higher because if the forming pressure is lower than 49 MPa, the porosity of the ceramic sintered product becomes higher than 2% or the pore diameter of the voids of the surface exceeds 50 µm. Further, it is because in the case the ceramic sintered product is a circular body that is used as a guide member, the fishing line tends to be damaged by the edges of the voids existing in the inner circumferential face of the circular body and the line may be possibly cut.

Further the forming pressure is controlled to be 196 MPa or lower because if it exceeds 196 MPa, the service life of the die to be used for forming may be shortened. The forming pressure is controlled to be 49 MPa to 196 MPa and therefore, the life of the die can be extended and at the same time the porosity of the circular body can be suppressed to 2% and the pore diameter of the voids of the surface can be made 50 µm or smaller, so that the damages or cutting of the fishing line can be suppressed.

Further, to control the fracture toughness $K_{1C}$ to be 7 MPa·m$^{0.5}$ or higher, at least one of zirconia and alumina is selected as a starting material for the second hard phase at the time of weighing and mixing and the mixing amount of the compound may be controlled to be 4% by weight or higher.

In the case the above-mentioned sintered product is obtained by heating and sintering in vacuum, it is preferable that the vacuum degree is 1.33 Pa or lower. That the vacuum degree is controlled to be 1.33 Pa or lower is because if it exceeds 1.33 Pa, the first hard phase of titanium nitride is oxidized to make it impossible to obtain a gold color ceramic sintered product. On the other hand, if the vacuum degree is controlled to be 1.33 Pa or lower, the first hard phase of titanium nitride is not oxidized during firing and accordingly a gold color circular body can be obtained.

Further, it is preferable to control the heating and sintering temperature to be in a range from 1200 to 1800° C. The heating and sintering temperature is controlled to be 1200° C. or higher, since if the temperature is lower than 1200° C., the porosity of the ceramic sintered product exceeds 2% or the pore diameter of the voids exceeds 50 µm. On the other hand, it is controlled to be 1800° C. or lower, since if the temperature exceeds 1800° C. the firing cost can be high. When the heating and sintering temperature is controlled to be 1200° C. to 1800° C., the porosity of the ceramic sintered product can be adjusted to be 2% or lower and the pore diameter of the voids can be also adjusted to be 50 µm or smaller and the firing cost can be lowered as well.

Particularly, the average crystal grain diameter can be controlled in a range form 0.6 to 2.6 µm by controlling the weight of the zirconia powder in a range from 15 to 18% by weight and the heating and sintering temperature in a range from 1575 to 1650° C.

The ceramic sintered product obtained in the above-mentioned manner gives satisfactorily beautiful, high grade, and mentally soothing impressions to a possessor and is excellent in the strength and sliding property and therefore preferably usable particularly for a guide member for a fishing line and a decorative member such as a case for a watch, a window member of a watch and the like.

Further, it can be used as various kinds of members such as a necklace, a necktie pin, a broach, a button, a medal, a wall material, and various kitchen members.

EXAMPLES

Hereinafter, Examples of the invention will be described practically in detail, the invention is not limited to these exemplified Examples.

Example 1

First, a titanium nitride powder (purity 99% or higher, average particle diameter 22.3 µm), a nickel powder (purity 99.5% or higher, average particle diameter 12.8 µm), and either a zirconia powder (purity 99.5% or higher, average particle diameter 1.5 µm) or an alumina powder (purity 99.0% or higher, average particle diameter 1.5 µm) were weighed and mixed properly to obtain starting material mixtures at proper ratios to give ceramic sintered products (hereinafter referred to as sintered products) with the respective component ratios as shown in Table 1. Next, each of the obtained starting material mixture was mixed with an isopropanol solution and pulverized and mixed by a vibration mill for 72 hours and successively 3% by weight of a binder such as paraffin wax was added to the obtained starting material mixture to obtain each dry powder. The obtained powder was pressure-formed at a pressure shown in Table 1 to produce each formed body with a desired circular shape according to each Example.

After being degreased at 600° C. in nitrogen atmosphere, the above-mentioned formed body was fired by keeping it at a temperature in the atmosphere as shown in Table 1 for 2 hours.

The vacuum degree in the case of firing in vacuum is as shown in Table 1.

TABLE 1

| Sample No. | First hard phase Type | % by weight | Second hard phase Type | % by weight | Binding phase Type | % by weight | Coloring component Type | % by weight | Forming pressure MPa | Atmosphere | Vacuum degree (Pa) | Firing temperature (° C.) |
|---|---|---|---|---|---|---|---|---|---|---|---|---|
| *1 | TiN | 93 | ZrO$_2$ | 0 | Ni | 7 | — | — | 98 | Nitrogen | — | 1200 |
| 2 | TiN | 92 | ZrO$_2$ | 1 | Ni | 7 | — | — | 98 | Nitrogen | — | 1300 |
| 3 | TiN | 89 | ZrO$_2$ | 4 | Ni | 7 | — | — | 98 | Nitrogen | — | 1550 |
| 4 | TiN | 77 | ZrO$_2$ | 16 | Ni | 7 | — | — | 98 | Nitrogen | — | 1600 |
| 5 | TiN | 68 | ZrO$_2$ | 25 | Ni | 7 | — | — | 98 | Nitrogen | — | 1750 |
| 6 | TiN | 67 | ZrO$_2$ | 26 | Ni | 7 | — | — | 98 | Nitrogen | — | 1800 |
| *7 | TiN | 93 | Al$_2$O$_3$ | 0 | Ni | 7 | — | — | 98 | Nitrogen | — | 1350 |
| 8 | TiN | 92 | Al$_2$O$_3$ | 1 | Ni | 7 | — | — | 98 | Nitrogen | — | 1400 |
| 9 | TiN | 89 | Al$_2$O$_3$ | 4 | Ni | 7 | — | — | 98 | Nitrogen | — | 1500 |
| 10 | TiN | 77 | Al$_2$O$_3$ | 16 | Ni | 7 | — | — | 98 | Nitrogen | — | 1600 |
| 11 | TiN | 68 | Al$_2$O$_3$ | 25 | Ni | 7 | — | — | 98 | Nitrogen | — | 1750 |
| 12 | TiN | 67 | Al$_2$O$_3$ | 26 | Ni | 7 | — | — | 98 | Nitrogen | — | 1800 |
| *13 | TiN | 85 | ZrO$_2$ | 15 | Ni | 0 | — | — | 98 | Nitrogen | — | 1800 |
| 14 | TiN | 83 | ZrO$_2$ | 15 | Ni | 2 | — | — | 98 | Nitrogen | — | 1700 |
| 15 | TiN | 81 | ZrO$_2$ | 15 | Ni | 4 | — | — | 98 | Nitrogen | — | 1650 |
| 16 | TiN | 77 | ZrO$_2$ | 15 | Ni | 8 | — | — | 98 | Nitrogen | — | 1550 |
| 17 | TiN | 75 | ZrO$_2$ | 15 | Ni | 10 | — | — | 98 | Nitrogen | — | 1500 |
| 18 | TiN | 73 | ZrO$_2$ | 15 | Ni | 12 | — | — | 98 | Nitrogen | — | 1450 |
| 19 | TiN | 79 | ZrO$_2$ | 15 | Ni | 6 | — | — | 98 | Nitrogen | — | 1600 |
| 20 | TiN | 79 | ZrO$_2$ | 15 | Ni | 6 | — | — | 98 | Argon | — | 1600 |
| 21 | TiN | 79 | ZrO$_2$ | 15 | Ni | 6 | — | — | 98 | Vacuum | 0.01 | 1600 |
| 22 | TiN | 79 | ZrO$_2$ | 15 | Ni | 6 | — | — | 98 | Vacuum | 1.33 | 1600 |
| 23 | TiN | 79 | ZrO$_2$ | 15 | Ni | 6 | — | — | 98 | Vacuum | 66 | 1600 |
| *24 | TiN | 79 | ZrO$_2$ | 15 | Ni | 6 | — | — | 98 | Atmospheric air | — | 1600 |
| *25 | TiN | 79 | ZrO$_2$ | 15 | Ni | 6 | — | — | 98 | Oxygen | — | 1600 |
| 26 | TiN | 79 | ZrO$_2$ | 15 | Ni | 6 | — | — | 44 | Vacuum | 0.001 | 1600 |
| 27 | TiN | 79 | ZrO$_2$ | 15 | Ni | 6 | — | — | 49 | Vacuum | 0.001 | 1600 |
| 28 | TiN | 79 | ZrO$_2$ | 15 | Ni | 6 | — | — | 98 | Vacuum | 0.001 | 1600 |
| 29 | TiN | 79 | ZrO$_2$ | 15 | Ni | 6 | — | — | 147 | Vacuum | 0.001 | 1600 |
| 30 | TiN | 79 | ZrO$_2$ | 15 | Ni | 6 | — | — | 196 | Vacuum | 0.001 | 1600 |
| 31 | TiN | 79 | ZrO$_2$ | 15 | Ni | 6 | — | — | 245 | Vacuum | 0.001 | 1600 |

(Samples marked with * were out of the scope of the invention)

One faces of the obtained samples of No. 1 to No. 31 were barrel-finished to be mirror faces and the porosity of these samples was measured by Archimedes' method to evaluate the appearance with eyes. In the appearance evaluation, respective marks show as follows: ○: beautiful gold color; Δ: whitish and dull gold color; and X: a color other than gold color.

The abrasion resistance test was carried out using an abrasion resistance evaluation apparatus whose schematic structure is shown in FIG. 1, by the method in which a fishing line made of nylon No. 3 as the thread 6 and the above-mentioned each sintered product was fixed in a jig. Other evaluation conditions were the conditions of 500 g load of as the load 4, 70 m/min moving speed of the thread 6, and 1000 m moving distance of the thread 6.

The results are shown in Table 2.

TABLE 2

| Sample No. | Porosity (%) | Depth of the abraded part (μm) | Color tone |
|---|---|---|---|
| *1 | 1> | 5.0 | ○ |
| 2 | 1> | 2.4 | ○ |
| 3 | 1> | 1> | ○ |
| 4 | 1> | 1> | ○ |
| 5 | 1.4 | 1> | ○ |
| 6 | 3 | 1> | Δ |
| *7 | 1> | 4.6 | ○ |
| 8 | 1> | 2.0 | ○ |
| 9 | 1> | 1> | ○ |
| 10 | 1> | 1> | ○ |
| 11 | 1.5 | 1> | ○ |
| 12 | 3.3 | 1> | Δ |
| *13 | 20 | — | X |
| 14 | 2.5 | 1> | Δ |
| 15 | 2 | 1> | ○ |
| 16 | 1> | 1> | ○ |
| 17 | 1> | 1> | ○ |
| 18 | 1> | 1> | Δ |
| 19 | 1> | 1> | ○ |
| 20 | 1> | 1> | ○ |
| 21 | 1> | 1> | ○ |
| 22 | 1> | 1> | ○ |
| 23 | 3.7 | 1> | Δ |
| *24 | 17 | — | X |
| *25 | 20 | — | X |
| 26 | 3.5 | 1> | Δ |
| 27 | 1.5 | 1> | ○ |
| 28 | 1> | 1> | ○ |
| 29 | 1> | 1> | ○ |
| 30 | 1> | 1> | ○ |
| 31 | 1> | 1> | ○ |

(Samples marked with * were out of the scope of the invention)

As being understood from Table 2, the samples of No. 1 and No. 11 containing no second hard phase had the depth of the abraded part as deep as 4.6 μm or deeper after the abrasion resistance test. On the other hand, the samples of Nos. 2 to 6 and 8 to 12 within the scope of the invention containing the second hard phase of zirconia or alumina had the depth of the abraded part as shallow as 2.4 μm or shallower and particularly, the samples of No. 3 to 6 and 9 to 12 containing 2% by weight or more of the second hard phase had further shallower depth of the abraded part, that is, 1 μM or shallower and thus were excellent in the abrasion resistance.

Further, with respect to the appearance, the samples of Nos. 6 and 12 containing the second hard phase in an amount exceeding 25% by weight showed dull gold color and the samples of Nos. 2 to 5 and 8 to 11 the second hard phase in an amount of 25% by weight or less showed beautiful gold color.

Further, as being understood from Table 2, the sample of No. 13 containing no nickel-containing binding phase had porosity as high as 20% even if the firing temperature was increased even to 1800° C. and the appearance could not be gold color.

Further, since the sample of No. 14 contains the binding phase in an amount of less than 4% by weight, the porosity is so high as to be 2.5% and the appearance was also whitish and dull gold color even if the firing temperature was increased to 1700° C. However, in the case the sample of No. 14 with such high porosity was used as a guide member for a fishing line, although the abrasion resistance of it was not deteriorated, the fishing line may be possibly damaged due to the edges of the voids existing in the inner circumferential face of the circular body.

Further, although having the porosity so low as to be lower than 1%, since the sample of No. 18 contained more than 10% by weight of the binding phase, it exhibited whitish and dull gold color. On the other hand, the samples of Nos. 15 to 17 contained the binding phase of nickel in an amount in a range from 4 to 10% by weight, so the porosity was lower than 2% and thus abrasion resistance could be maintained and beautiful gold color was shown.

Being understood from Table 2, the samples of Nos. 19 to 23 fired in nitrogen, argon, or vacuum had the depth of the abraded part as shallow as 1 μm or shallower and exhibited gold color appearance. Particularly, the samples of Nos. 21 and 22 fired in nitrogen, argon, or vacuum with a vacuum degree of 1.33 Pa or lower exhibited beautiful gold color appearance. On the other hand, both of the sample of No. 24 fired in the atmosphere and the sample of No. 25 fired in oxygen atmosphere could not become a dense sintered product and therefore broken during the barrel polishing.

Further, being understood from Table 2, the sample of No. 26 produced at forming pressure lower than 49 MPa, the porosity exceeded 2% and the appearance was not beautiful gold color. In the case the sample of No. 26 with such high porosity was used as a guide member for a fishing line, although the abrasion resistance of it was not deteriorated, the fishing line may be possibly damaged due to the edges of the voids existing in the inner circumferential face of the circular body. In the case the sample of No. 31 produced at forming pressure exceeding 196 MPa, although the porosity was so low as to be less than 1% and the appearance was beautiful gold color and excellent, the die may be possibly broken if the forming pressure was increased further. On the other hand, the samples of No. 27 to 30 produced at forming pressure in a range from 49 to 196 MPa had porosity so low as to be 1.5% or lower and beautiful gold color appearance as well and they were thus preferable.

Example 2

Similarly to Example 1, a titanium nitride powder (purity 99% or higher, average particle diameter 22.3 μm), a nickel powder (purity 99.5% or higher, average particle diameter 12.8 μm), and either a zirconia powder (purity 99.5% or higher, average particle diameter 1.5 μm) or an alumina powder (purity 99.0% or higher, average particle diameter 1.5 μm) were weighed and mixed properly to obtain starting material mixtures at proper ratios to give ceramic sintered products with the respective component ratios as shown in Table 3. Further, starting material mixtures additionally containing powders of vanadium pentoxide, cobalt oxide, ferric oxide, erbium oxide, and titanium carbide as a coloring component as shown in Table 3 were also prepared. Next, each of the obtained starting material mixtures was mixed with an isopropanol solution and pulverized and mixed by a vibration mill for 72 hours and successively 3% by weight of a binder such as paraffin wax was added to the resulting starting material mixture to obtain each dry powder. The obtained powder was pressure-formed at a pressure shown in Table 3 to produce each formed body with a desired disk shape according to each Example.

After being degreased at 600° C. in nitrogen atmosphere, the above-mentioned formed body was fired by keeping it at a temperature in the atmosphere as shown in Table 3 for 2 hours.

TABLE 3

| Sample No. | First hard phase | | Second hard phase | | Binding phase | | Coloring component | | Forming pressure MPa | Atmosphere | Vacuum degree (Pa) | Firing temperature (° C.) |
|---|---|---|---|---|---|---|---|---|---|---|---|---|
| | Type | % by weight | Type | % by weight | Type | % by weight | Type | % by weight | | | | |
| 32 | TiN | 82 | $Al_2O_3$ | 10 | Ni | 7 | $Fe_2O_3$ | 1 | 98 | Nitrogen | — | 1450 |
| 33 | TiN | 89 | $Al_2O_3$ | 4 | Ni | 7 | — | — | 98 | Nitrogen | — | 1450 |
| 34 | TiN | 89 | $Al_2O_3$ | 4 | Ni | 7 | — | — | 98 | Nitrogen | — | 1500 |
| 35 | TiN | 89 | $ZrO_2$ | 3 | Ni | 7 | $V_2O_3$ | 1 | 98 | Nitrogen | — | 1450 |
| 36 | TiN | 90 | $ZrO_2$ | 3 | Ni | 7 | — | — | 98 | Nitrogen | — | 1450 |
| 37 | TiN | 90 | $ZrO_2$ | 3 | Ni | 7 | — | — | 98 | Nitrogen | — | 1500 |
| 38 | TiN | 83 | $ZrO_2$ | 9 | Ni | 7 | CoO | 1 | 98 | Nitrogen | — | 1450 |
| 39 | TiN | 84 | $ZrO_2$ | 9 | Ni | 7 | — | — | 98 | Nitrogen | — | 1500 |
| 40 | TiN | 89 | $ZrO_2$ | 4 | Ni | 7 | — | — | 98 | Nitrogen | — | 1600 |
| 41 | TiN | 89 | $ZrO_2$ | 4 | Ni | 7 | — | — | 98 | Nitrogen | — | 1550 |
| 42 | TiN | 90 | $ZrO_2$ | 2 | Ni | 7 | $Fe_2O_3$ | 1 | 98 | Nitrogen | — | 1450 |
| 43 | TiN | 91 | $ZrO_2$ | 2 | Ni | 7 | — | — | 98 | Nitrogen | — | 1500 |
| 44 | TiN | 90 | $ZrO_2$ | 2 | Ni | 7 | $Er_2O_3$ | 1 | 98 | Nitrogen | — | 1450 |
| 45 | TiN | 91 | $ZrO_2$ | 2 | Ni | 7 | — | — | 98 | Nitrogen | — | 1550 |
| 46 | TiN | 91 | $ZrO_2$ | 2 | Ni | 7 | — | — | 98 | Nitrogen | — | 1600 |
| 47 | TiN | 90 | $ZrO_2$ | 2 | Ni | 7 | TiC | 1 | 98 | Nitrogen | — | 1450 |
| 48 | TiN | 86 | $ZrO_2$ | 9 | Ni | 5 | — | — | 98 | Nitrogen | — | 1550 |
| 49 | TiN | 79 | $ZrO_2$ | 15 | Ni | 6 | — | — | 98 | Nitrogen | — | 1600 |
| 50 | TiN | 76 | $ZrO_2$ | 18 | Ni | 6 | — | — | 98 | Nitrogen | — | 1650 |

TABLE 3-continued

| Sample No. | First hard phase Type | First hard phase % by weight | Second hard phase Type | Second hard phase % by weight | Binding phase Type | Binding phase % by weight | Coloring component Type | Coloring component % by weight | Forming pressure MPa | Atmosphere | Vacuum degree (Pa) | Firing temperature (° C.) |
|---|---|---|---|---|---|---|---|---|---|---|---|---|
| 51 | TiN | 89 | ZrO$_2$ | 4 | Ni | 7 | — | — | 98 | Nitrogen | — | 1500 |
| 52 | TiN | 89 | ZrO$_2$ | 4 | Ni | 7 | — | — | 98 | Nitrogen | — | 1500 |
| 53 | TiN | 78 | ZrO$_2$ | 25 | Ni | 7 | — | — | 98 | Nitrogen | — | 1700 |
| 54 | TiN | 78 | ZrO$_2$ | 25 | Ni | 7 | — | — | 98 | Nitrogen | — | 1800 |
| 55 | TiN | 78 | ZrO$_2$ | 25 | Ni | 7 | — | — | 98 | Nitrogen | — | 1900 |
| 56 | TiN | 91 | ZrO$_2$ | 2 | Ni | 7 | — | — | 98 | Nitrogen | — | 1100 |
| 57 | TiN | 91 | ZrO$_2$ | 2 | Ni | 7 | — | — | 98 | Nitrogen | — | 1200 |
| 58 | TiN | 91 | ZrO$_2$ | 2 | Ni | 7 | — | — | 98 | Nitrogen | — | 1500 |
| 59 | TiN | 91 | ZrO$_2$ | 2 | Ni | 7 | — | — | 98 | Nitrogen | — | 1600 |
| 60 | TiN | 84 | ZrO$_2$ | 9 | Ni | 7 | — | — | 98 | Nitrogen | — | 1600 |
| *61 | TiN | 93 | ZrO$_2$ | 0 | Ni | 7 | — | — | 98 | Nitrogen | — | 1550 |

(Samples marked with * were out of the scope of the invention)

One faces of the obtained samples of No. 32 to No. 52 shown in Table 3 were lapped using a diamond paste to finish the surfaces with a arithmetical mean deviation Ra in a range from 0.05 to 0.23 µm. Further, the color tone of each of the above-mentioned surfaces was measured by using a spectro-colorimeter (CM-3700d, manufactured by Konica Minolta Holding Co., Ltd.) and setting a light source at the CIE standard light source D65 and a visible angle 10° according to JIZ X 8722-2000.

The arithmetical mean deviation Ra was measured according to JIS B 0601-2000.

With respect to the color tone, questionnaire relevant to four items: satisfaction for beauty, high grade impression, psychologically soothing feeling, and luster: was carried out by 40 panelists in total of each 5 men and women in their twenties to fifties and the ratio of the panelists who replied "sensible" for the items was shown in Table 4.

As being understood from Table 4, the samples of Nos. 32, 35, 38, 42, 44, 47 having values out of one of lightness L* in a range from 60 to 70, chromaticness a* in range from 7.0 to 8.2, and chromaticness b* in range from 16.5 to 24.5 could not sufficiently satisfy the panelists.

On the other hand, the samples of Nos. 33, 34, 36, 37, 39 to 41, 43, 45, 46, 48 and 52 having lightness L* in a range from 60 to 70, chromaticness a* in range from 7.0 to 8.2, and chromaticness b* in range from 16.5 to 24.5 could give satisfactorily beautiful, high grade, and mentally soothing impressions to almost all of the panelists and could sufficiently satisfy the panelists.

Particularly, the samples of Nos. 34, 36, 37, 39 to 40, 45, 48, and 52 having lightness L* in a range from 63 to 67, chromaticness a* and b* in ranges from 7.50 to 7.85 and from 16.5 to 19, respectively, could give satisfactorily beautiful, high grade, and mentally soothing impressions to all of the panelists and could be evaluated high by the panelists.

TABLE 4

| Sample no. | Arithmetical mean deviation Ra (µm) | Lightness L* | Chromaticness a* | Chromaticness b* | Satisfaction for beauty (%) | High grade impression (%) | Psychologically soothing feeling (%) | Luster (%) | The minimum reflectance $R_{min}$ (%) | The maximum reflectance $R_{max}$ (%) | The reflectance difference ΔR (%) | Metamerism (%) |
|---|---|---|---|---|---|---|---|---|---|---|---|---|
| 32 | 0.22 | 55 | 7.85 | 19 | 55 | 50 | 45 | 90 | — | — | — | — |
| 33 | 0.15 | 60 | 7.85 | 19 | 90 | 90 | 90 | 100 | 19.5 | 47.2 | 27.7 | 100 |
| 34 | 0.1 | 63 | 7.85 | 19 | 100 | 100 | 100 | 100 | 21.9 | 54.1 | 32.2 | 100 |
| 35 | 0.15 | 66 | 6 | 19 | 50 | 50 | 60 | 100 | — | — | — | — |
| 36 | 0.12 | 66 | 7 | 19 | 100 | 100 | 100 | 100 | 22.7 | 55.3 | 32.6 | 100 |
| 37 | 0.1 | 66 | 7.68 | 19 | 100 | 100 | 100 | 100 | 23.3 | 57.6 | 34.3 | 100 |
| 38 | 0.2 | 66 | 7.85 | 13 | 50 | 60 | 60 | 100 | — | — | — | — |
| 39 | 0.15 | 66 | 7.85 | 18 | 100 | 100 | 100 | 100 | 22.9 | 56.4 | 33.5 | 100 |
| 40 | 0.06 | 66 | 7.85 | 19 | 100 | 100 | 100 | 100 | 22.9 | 57.9 | 35 | 100 |
| 41 | 0.12 | 66 | 7.85 | 24.5 | 100 | 100 | 100 | 100 | 23 | 58.1 | 35.1 | 100 |
| 42 | 0.18 | 66 | 7.85 | 25 | 60 | 50 | 60 | 100 | — | — | — | — |
| 43 | 0.16 | 66 | 8.2 | 19 | 100 | 95 | 95 | 100 | 24 | 60.1 | 36.1 | 100 |
| 44 | 0.21 | 66 | 10 | 19 | 50 | 45 | 60 | 90 | — | — | — | — |
| 45 | 0.1 | 67 | 7.85 | 19 | 100 | 100 | 100 | 100 | 23.4 | 59.2 | 35.8 | 100 |
| 46 | 0.09 | 70 | 7.85 | 19 | 90 | 90 | 90 | 100 | 23.8 | 60.7 | 36.9 | 100 |
| 47 | 0.21 | 74 | 7.85 | 19 | 50 | 45 | 45 | 90 | — | — | — | — |
| 48 | 0.12 | 66 | 7.64 | 17.7 | 100 | 100 | 100 | 100 | 22.4 | 56.8 | 34.4 | 100 |
| 49 | 0.07 | 65 | 7.51 | 16.5 | 100 | 100 | 100 | 100 | 22.1 | 53.4 | 31.3 | 100 |
| 50 | 0.05 | 63 | 7.59 | 16.5 | 100 | 100 | 100 | 100 | 20.7 | 50.7 | 30 | 100 |
| 51 | 0.2 | 66 | 7.85 | 19 | 100 | 100 | 100 | 100 | — | — | — | — |
| 52 | 0.23 | 66 | 7.85 | 19 | 100 | 100 | 100 | 80 | 15.5 | 38.3 | 22.8 | 50 |

Further, the samples of Nos. 33, 34, 36, 37, 39 to 41, 43, 45, 46, 48 to 50, and 52 were subjected to surface reflectance measurement by using a spectrocolorimeter (CM-3700d, manufactured by Konica Minolta Holding Co., Ltd.) and setting a light source at the CIE standard light source D65 and a visible angle 10° in a wavelength region from 360 to 740 nm (according to JIS Z 8722-2000). More practically, the minimum surface reflectance $R_{min}$ and the maximum surface reflectance $R_{max}$ in the wavelength range were measured and the difference $\Delta R$ (=$R_{max}$-$R_{min}$) of the minimum surface reflectance $R_{min}$ and the maximum surface reflectance $R_{max}$ was calculated. The results are shown in Table 4. Further, light was radiated respectively from the CIE standard light source D65 and standard light source A to these samples and the questionnaire whether the panelists could feel the metamerism phenomenon and enjoy various color tones was carried out. The ratios of the panelists who gave positive reply in the questionnaire are shown in Table 4.

As being understood from Table 4, the evaluations of the panelist for the sample of No. 52 lower than 27.7% of the difference of the maximum surface reflectance and the minimum surface reflectance differed, however it can understood that the samples of Nos. 33, 34, 36, 37, 39 to 41, 43, 45, 46, 48 to 50 having 27.7% or higher difference of the maximum surface reflectance and the minimum surface reflectance gave good impressions to the panelists.

Further, as being understood from Table 4 the sample of No. 52 having the surface arithmetical mean deviation Ra exceeding 0.2 μm could give satisfactorily beautiful, high grade, and mentally soothing impressions to all of the panelists, however it failed to give a luster impression to all of the panelists. On the other hand, the samples of Nos. 33, 34, 36, 37, 39, 40, 41, 43, 45, 46, 48 to 51 having the surface arithmetical mean deviation Ra exceeding 0.2 μm or smaller could give satisfactorily beautiful, high grade, mentally soothing, and luster impressions to all of the panelists.

Example 3

One faces of the samples of Nos. 53 to 59 shown in Table 3 were barrel-finished to have the surface arithmetical mean deviation Ra of 0.05 to 0.2 μm and after that, the porosity of the sintering products was measured by Archimedes' method. The pore diameter of the voids was measured by photographing the surface at 400 times magnification and the pore diameter of the largest voids was measured. The appearance was observed with eyes. The results are shown in Table 5.

In Table 5, the respective marks show as follows: ○: beautiful gold color; Δ: whitish and dull gold color; and X: a color other than gold color.

TABLE 5

| Sample No. | Porosity (%) | Pore diameter (μm) | Color tone | Damage of fishing line |
|---|---|---|---|---|
| 53 | 1> | 14 | ○ | None |
| 54 | 1> | 8 | ○ | None |
| 55 | 2.5 | 50 | Δ | Occurring |
| 56 | 3.5 | 63 | Δ | Occurring |
| 57 | 1> | 50 | ○ | None |

TABLE 5-continued

| Sample No. | Porosity (%) | Pore diameter (μm) | Color tone | Damage of fishing line |
|---|---|---|---|---|
| 58 | 1> | 27 | ○ | None |
| 59 | 1> | 20 | Δ | Occurring |

As being understood from Table 5, the samples of Nos. 53, 54, 57 to 59, fired at a firing temperature of 1200 to 1800° C. had the porosity lower than 1% and the pore diameter of 50 μm or smaller and showed beautiful gold color appearance. On the other hand, the sample of No. 55 fired at a firing temperature of 1900° C. had the porosity as high as 2.5% and in the case it was used as a guide member for a fishing line, the abrasion resistance of itself was not deteriorated, however the fishing line was damaged due to the edges of the voids existing in the inner circumferential face of the circular body. Further, with respect to the sample of No. 56 fired at a firing temperature of 1100° C., since sintering was not sufficiently promoted, the porosity was as high as 3.5% and the pore diameter was 63 μm and therefore the sintered body was porous and had many voids and in the case it was used as a guide member for a fishing line, similarly to the sample of No. 55, although the abrasion resistance of itself was not deteriorated, the fishing line was damaged due to the edges of the voids existing in the inner circumferential face of the circular body.

Example 4

One faces of the disk-like samples of Nos. 41, 60 and 61 shown in Table 3 were lapped to have the surface arithmetical mean deviation Ra in a range from 0.05 to 0.2 μm and after that, the fracture toughness $K_{1C}$ was measured by Indetation-Fracture method (IF method) according to JIS R 1607-1995.

The surfaces of the disk-like samples of Nos. 41, 60 and 61 were barrel-finished to have the surface arithmetical mean deviation Ra in a range from 0.05 to 0.2 μm and after that, the obtained samples were attached to fishing tools as guide members for a fishing line. The obtained fishing tools were practically tested by hitting the fishing tools to a shore reef of a fishing site. The occurrence of microcracks in the samples after the practical test was observed using a metal microscope at 100 times magnification. In Table 6, those marked with X showed that the microcracks were observed therein and those marked with ○ showed that no microcrack was observed.

TABLE 6

| Sample No. | Fracture toughness $K_{1c}$ (MPa·m$^{0.5}$) | Practical test |
|---|---|---|
| 41 | 7 | ○ |
| 60 | 9.2 | ○ |
| *61 | 6 | X |

(Samples marked with * were out of the scope of the invention)

It can be understood from Table 6 that when the sample of No. 61 having the fracture toughness $K_{1C}$ of lower than 7 MPa·m$^{0.5}$ was hit against the shore reef at the fishing site, it was observed that microcracks were formed and therefore, it can be understood that it is difficult to keep the decorative value for a long duration.

On the other hand, the samples of No. 41 and 60 both had the fracture toughness $K_{1C}$ of 7 MPa·m$^{0.5}$ or higher and when they were hit against the shore reef at the fishing site, it was observed that no microcrack was formed and therefore, it can be understood that it is possible to keep the decorative value for a long duration.

Example 5

First, a titanium nitride powder (purity 99% or higher, average particle diameter 22.3 μm) as the first hard phase, a zirconia powder (purity 99.5% or higher, average particle diameter 1.5 μm) as the second hard phase, and a nickel powder (purity 99.5% or higher, average particle diameter 12.8 μm) as a binding phase were weighed and mixed at the respective component ratios of 79, 15, and 6% by weight to obtain starting material mixtures.

Next, the starting material mixtures mixed with a methanol solution were loaded together with a ball made of TiC having a Vicker's hardness Hv 16 GPa, fracture toughness $K_{1C}$ of 8.5 MPa·m$^{0.5}$, and relative density of 97% to a vibration mill and pulverized and mixed for the time shown in Table 7 and after 3% by weight of a prescribed binder was added to the obtained starting material mixtures, the mixtures were granulated by a spray drying method to obtain granules. The crushed grain size of the obtained granules was measured using microtrack grain size distribution measurement apparatus and then the granules were pressure-formed at a pressure of 98 MPa to obtain disk-like formed bodies.

The above-mentioned formed bodies were degreased at 600° C. in nitrogen atmosphere and successively fired at 1575° C. in nitrogen atmosphere for 2 hour retention time.

One faces of the obtained samples of No. 62 to 67 were lapped using a diamond paste to have the mirror surfaces and according to JIS R 1610-2003, Vicker's hardness Hv (hereinafter, referred to as hardness) of the mirror surfaces was measured and then the samples were crushed to calculate the solid solution amount of carbon by x-ray deflection, that is, the value of x in the TiC$_x$N$_{(1-x)}$ with reference to the JCPDS card.

As being understood from Table 7, the sample of No. 62 having x lower than 0.01 had hardness, 12.9 GPa, slightly low. On the other hand, the samples of Nos. 63 to 66 having x in a range from 0.01 to 0.08 all had hardness as high as 13.4 GPa or higher and good abrasion resistance. However the sample of No. 67 having x exceeding 0.08 was found slightly inferior in the decorative value by visual observation although having the hardness as high as 13.7 GPa.

Example 6

First, a titanium nitride powder (purity 99% or higher, average particle diameter 22.3 μm), a nickel powder (purity 99.5% or higher, average particle diameter 12.8 μm), a zirconia powder (purity 99.5% or higher, average particle diameter 1.5 μm), and a chromium carbide powder for some samples were weighed and mixed so properly as to give sintered products at the respective component ratios shown in Table 8 to obtain starting material mixtures.

Next, the starting material mixtures mixed with a methanol solution were loaded together with a ball made of TiC having a Vicker's hardness Hv 16 GPa, fracture toughness $K_{1C}$ of 8.5 MPa·m$^{0.5}$, and relative density of 97% to a vibration mill and pulverized and mixed for 90 hours and after 3% by weight of a prescribed binder was added to the obtained starting material mixtures, the mixtures were granulated by a spray drying method to obtain granules. The granules were pressure-formed at a pressure of 98 MPa to obtain disk-like formed bodies.

After the above-mentioned formed bodies were degreased at 600° C. in nitrogen atmosphere, they were fired at 1575° C. in nitrogen for 2 hour retention time.

After one faces of the obtained samples of Nos. 68 to 73 were lapped using a diamond paste to have mirror surfaces and the Vicker's hardness and the fracture toughness were measured according to JIS R 1610-2003 ad JIS R 1607-1995, respectively.

TABLE 7

| Sample no. | TiN % by weight | ZrO$_2$ % by weight | Ni % by weight | Pulverization time (Hour) | Pulverization grain size (μm) | Vicker's hardness Hv (GPa) | x | Remarks |
| --- | --- | --- | --- | --- | --- | --- | --- | --- |
| 62 | 79 | 15 | 6 | 70 | 0.65 | 12.9 | 0.005 | |
| 63 | 79 | 15 | 6 | 90 | 0.5 | 13.4 | 0.01 | |
| 64 | 79 | 15 | 6 | 110 | 0.46 | 13.5 | 0.03 | |
| 65 | 79 | 15 | 6 | 130 | 0.43 | 13.6 | 0.05 | |
| 66 | 79 | 15 | 6 | 150 | 0.41 | 13.7 | 0.08 | |
| 67 | 79 | 15 | 6 | 170 | 0.4 | 13.7 | 0.09 | Color tone deteriorated |

TABLE 8

| Sample no. | TiN % by weight | ZrO$_2$ % by weight | Ni % by weight | Cr$_2$C$_3$ % by weight | Vicker's hardness Hv (GPa) | Fracture toughness K$_{1C}$ (MPa·m$^{0.5}$) | Remarks |
|---|---|---|---|---|---|---|---|
| 68 | 79 | 9 | 12 | 0 | 13.4 | 6.8 | |
| 69 | 79 | 15 | 3 | 3 | 13.5 | 6.9 | |
| 70 | 79 | 16 | 0.5 | 4.5 | 13.6 | 7 | |
| 71 | 79 | 9 | 6 | 6 | 13.6 | 7.1 | |
| 72 | 79 | 9 | 4.6 | 7.4 | 13.7 | 7.1 | |
| 73 | 79 | 9 | 3 | 9 | 13.7 | 7.2 | Color tone deteriorated |

As being understood from Table 8, the sample of No. 68 containing less than 3% by weight of chromium carbide had slightly low hardness and fracture toughness, whereas the samples of Nos. 69 to 72 containing chromium carbide in a range from 3 to 7.4% by weight had both high hardness and fracture toughness and thus were excellent. However the sample of No. 73 containing chromium carbide in an amount exceeding 7.4% by weight was found having reddish color tone and inferior in the decorative value by visual observation although having both high hardness and fracture toughness.

Example 7

First, a titanium nitride powder (purity 99% or higher, average particle diameter 22.3 µm), a nickel powder (purity 99.5% or higher, average particle diameter 12.8 µm), and a zirconia powder (purity 99.5% or higher, average particle diameter 1.5 µm) were weighed and mixed so properly as to give sintered products at the respective component ratios shown in Table 9 to obtain starting material mixtures.

Next, the starting material mixtures mixed with a methanol solution were loaded together with a ball made of TiC having a Vicker's hardness Hv 16 GPa, fracture toughness K$_{1C}$ of 8.5 MPa·m$^{0.5}$, and relative density of 97% to a vibration mill and pulverized and mixed for 90 hours and after 3% by weight of a prescribed binder was added to the obtained starting material mixtures, the mixtures were granulated by a spray drying method to obtain granules. The granules were pressure-formed at a pressure of 98 MPa to obtain circular formed bodies.

After the above-mentioned formed bodies were degreased at 600° C. in nitrogen atmosphere, they were fired at a temperature shown in Table 9 in nitrogen for 2 hour retention time.

After one faces of the obtained samples of Nos. 74 to 82 were barrel-finished to have mirror surfaces, an abrasion resistance test was performed.

The abrasion resistance test was carried out using the abrasion resistance evaluation apparatus shown in FIG. 1 for the abrasion resistance test and a fishing line (Ginrin Σ3) to which mud was deposited as the thread 6 and the samples of Nos. 74 to 82 were fixed at a prescribed position by a tool. The evaluation conditions were set to be as follows: the load 4: 700 g load; the moving speed of the thread 6: 60 m/min; and the moving distance of the thread 6: 3000 m.

The results are shown in Table 9.

TABLE 9

| Sample no. | TiN % by weight | ZrO$_2$ % by weight | Ni % by weight | Firing temperature (° C.) | Average crystal grain size (µm) | Depth of the abraded part (µm) |
|---|---|---|---|---|---|---|
| 74 | 79 | 11 | 10 | 1575 | 3 | 20 |
| 75 | 79 | 15 | 6 | 1575 | 0.6 | 15 |
| 76 | 79 | 16 | 5 | 1550 | 0.4 | 20 |
| 77 | 79 | 16 | 5 | 1575 | 0.6 | 16 |
| 78 | 79 | 16 | 5 | 1610 | 1.2 | 15 |
| 79 | 79 | 16 | 5 | 1650 | 2.6 | 16 |
| 80 | 79 | 16 | 5 | 1700 | 3 | 21 |
| 81 | 79 | 18 | 3 | 1575 | 0.8 | 16 |
| 82 | 79 | 20 | 1 | 1575 | 3.2 | 24 |

As being understood from Table 9, the sample of No 76 having an average crystal grain size smaller than 0.6 µm and the samples of No. 74, 80, 82 having an average crystal grain size exceeding 2.6 µm all had the depth of the abraded parts as deep as 20 µm or deeper. The samples of No. 75 to 81 having an average crystal grain size in a range from 0.6 to 2.6 µm all had the depth of the abraded parts as shallow as 16 µm or shallower and were found excellent.

Additionally, those which contained both of alumina and zirconia in place of either alumina or zirconia as the second hard phase showed the results similar to those described above.

A ceramic sintered product of the invention is lightweight, excellent in the abrasion resistance in wet state, and suitable for improving the inspection precision by an automatic appearance inspection apparatus; gives satisfactorily beautiful, high grade, and mentally soothing impressions to a possessor who requires decorative value; and also shows gold color tone and therefore it is usable as broach, a necklace, a medal, a button, a wall material, an abrasion resistant part for various kitchen members and additionally usable for a guide member for a fishing line and decorative members such as a case of a watch and a window part of a watch.

What is claimed is:

1. A ceramic sintered product comprising:
   a first hard phase containing a nitride of titanium;
   a second hard phase containing at least one of alumina and zirconia; and
   a binding phase containing nickel,
   wherein the first phase contains carbon in solid phase and defined by the following formula TiC$_x$N$_{(1-x)}$ (0.03≦x≦0.08),
   wherein the ceramic sintered product comprises 11 to 25% by weight of the second hard phase and 4 to 10% by weight of the binding phase, and the balance comprising the first hard phase.

2. The ceramic sintered product according to claim 1 further comprising 3 to 7.4% by weight of chromium carbide in addition.

3. The ceramic sintered product according to claim 1, wherein the first hard phase and the second hard phase both having the average grain diameter of 0.6 to 2.6 μm.

4. The ceramic sintered product according to claim 1 having the surface lightness L* in a range from 60 to 70 and the surface chromaticness a* and b* in ranges of 7.0 to 8.2 and 16.5 to 24.5, respectively, in the L*a*b* color model in CIE 1976 space.

5. The ceramic sintered product according to claim 1 having 27.7% or higher difference between the maximum value and the minimum value of the surface reflectance in the visible region.

6. The ceramic sintered product according to claim 1 having 0.2 μm or smaller surface arithmetical mean deviation Ra.

7. The ceramic sintered product according to claim 1 having 2% or smaller porosity.

8. The ceramic sintered product according to claim 1 having 50 μm or smaller diameter of the voids in the surface.

9. The ceramic sintered product according to claim 1 having 7 MPa·m$^{0.5}$ or higher fracture toughness $K_{1C}$.

10. A production method of a ceramic sintered product according to claim 1, comprising the steps of:

mixing a powder of titanium nitride, a powder containing at least alumina and zirconia, and a powder of nickel for obtaining a starting material mixture;

forming a formed body with a prescribed form by pressure compacting the starting material mixture; and producing a sintered product by heating and sintering the formed body in atmosphere containing at least one of nitrogen and inert gases or in vacuum.

11. The production method of the ceramic sintered product according to claim 10, wherein the starting material mixture has 0.5 μm or smaller pulverized grain size (D50).

12. The production method of a ceramic sintered product according to claim 10, wherein forming is carried out at a forming pressure in a range from 49 to 196 MPa.

13. The production method of a ceramic sintered product according to claim 10, wherein heating and sintering is carried out at a vacuum degree in a range from 1.33 Pa or lower.

14. The production method of a ceramic sintered product according to claim 10, wherein the heating and sintering temperature is in a range from 1200 to 1800° C.

15. A decorative member made of the ceramic sintered product according to claim 1.

16. The production method of a ceramic sintered product according to claim 11, wherein forming is carried out at a forming pressure in a range from 49 to 196 MPa.

\* \* \* \* \*